United States Patent [19]

Talyzin et al.

[11] 4,250,028
[45] Feb. 10, 1981

[54] MACHINE FOR SORTING AND RETRIEVAL OF FLAT OBJECTS

[76] Inventors: Nikolai V. Talyzin, Novo-konjusherny, pereulok, 11, kv. 37; Solomon M. Rozengauz, ulitsa Marshala, Birjuzova, 43, kv. 142; Vasily F. Tikhonov, ulitsa Narodnogo opolchenia, 20, kv. 170; Nikolai K. Mosolov, 3 Khoroshevskaya, ulitsa, 5, korpus 1, kv. 50, all of Moscow, U.S.S.R.

[21] Appl. No.: 38,110

[22] Filed: May 11, 1979

[30] Foreign Application Priority Data

Jun. 8, 1978 [SU] U.S.S.R. ............ 2627908

[51] Int. Cl.³ .................................................. B07C 3/10
[52] U.S. Cl. .................................. 209/583; 209/900; 414/134
[58] Field of Search ............ 209/509, 552, 554, 569, 209/583, 900; 414/134

[56] References Cited

U.S. PATENT DOCUMENTS

| | | | |
|---|---|---|---|
| 3,184,061 | 5/1965 | Levy | 209/552 |
| 3,595,388 | 7/1971 | Castaldi | 209/583 X |
| 3,930,992 | 1/1976 | Baumel et al. | 209/552 |
| 4,067,459 | 1/1978 | Rozengauz et al. | 209/900 X |
| 4,132,313 | 1/1979 | Kolosov | 414/134 X |
| 4,171,746 | 10/1979 | Talyzin et al. | 209/900 X |

Primary Examiner—Joseph J. Rolla
Attorney, Agent, or Firm—Lackenbach, Lilling & Siegel

[57] ABSTRACT

The machine is designed for automatic sorting of flat objects and automatic unloading of groups of sorted objects and comprises a cylindrical housing on whose walls storages of objects are arranged in several decks over the periphery thereof. A conveyor for conveying the objects is fashioned as a squirrel-cage return drum accommodated inside the housing, said drum carrying on its spokes, with a possibility of moving along the latter, object holders designed to convey the objects to the storages, containers for delivering the objects from the storages and cams for moving storage platforms upon the extraction of objects, said cams cooperating via selector unit with a respective profile of a stationary master form. A feeder for feeding the objects into the machine is provided with a mechanism for feeding an array of objects, a separator and an inspection unit for identifying the distinguishing feature of each object. The machine is further provided with a conveyer for conveying the objects out of the machine and with a processor for automatic control of the machine.

7 Claims, 18 Drawing Figures

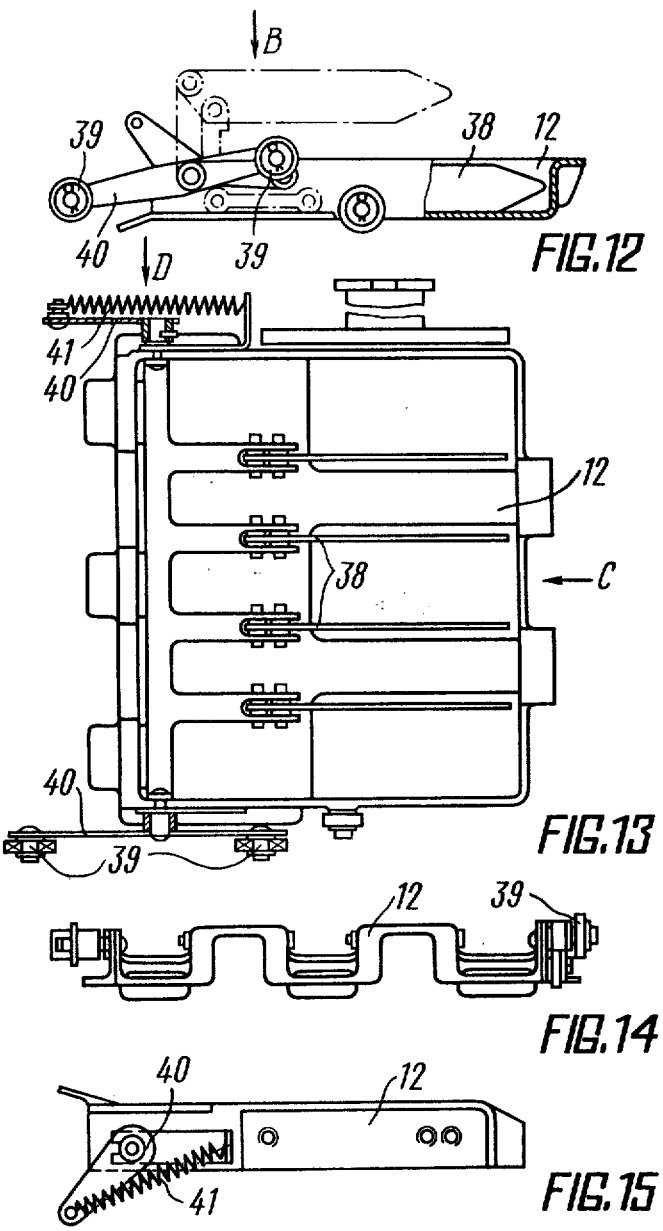

MACHINE FOR SORTING AND RETRIEVAL OF FLAT OBJECTS

FIELD OF THE INVENTION

The present invention relates to the automation of the processes of sorting and retrieval of flat objects such as those used for filing, i.e., various blank forms, checks, bank accounts, inventory forms, typed sheets, loose punched cards or punched cards packed in, say, envelopes and, more particularly, this invention relates to a machine designed for the sorting and retrieval of flat objects.

The invention can be used most advantageously in information retrieval systems designed to solve the problem of providing an automatic retrieval of originals of documents.

Social progress and rapid development of science and technology have now caused an avalanche-like growth of the flow of information, which is generally referred to as "information explosion".

As a result, a need has arisen in the development of information retrieval systems which could be used for the accumulation, storage, updating and retrieval of requested data.

An information retrieval system comprises a combination of an information retrieval language and rules of translation from a natural language to information retrieval one and back.

An important component of an information retrieval system is its hardware which comprises a special machine or a specific combination of technical means and is designed for the practical execution of the process of document retrieval.

Information retrieval systems are divided into document retrieval systems and data retrieval systems. The former serve for the output of originals, copies or addresses of data-containing documents, while the latter serve for the output of data proper, for example, melting point, properties of substances, planning and economic data.

Information carriers of two types are used in information retrieval systems, namely, continuous and discrete ones.

Continuous information carriers include magnetic tapes, disks, drums, punched tapes and microfilms.

Discrete information carriers include originals of documents, punched cards, aperture punched cards and microfiches.

Intensive search is under way in a number of countries for the design of fully automatic information retrieval hardware capable of handling originals of documents at a high operation speed.

DESCRIPTION OF THE PRIOR ART

Known in the art are analogous structures designed for the afore-described purposes.

British Pat. No. 964,274, class B 6E, of 1964, discloses a revolving file for storing cards, which comprises a revolving cylindrical housing divided by means of partitions into radial sections and the storages for cards. Each storage is provided with a radial arm articulated on the housing pivot and supporting (clamping) the cards in the storage. The turn of the arm upon variation of the number of cards held thereby is effected as a result of cooperation of the arm with a toothed ring-shaped rack whose position corresponds to that of the storages.

Said structure suffers from the lack of automatic delivery of documents to storages and of automatic unloading of the latter. No provision is made for an automatic retrieval of the desired document. The operation speed of the system is very low. British Pat. No. 1,311,207, class B 6E, of 1973, discloses a revolving file comprising a rotor made up of two horizontally extending disks arranged one above the other and interconnected by means of vertical uprights. The space between the rotor disks is divided by means of vertically extending radial partitions into storages for objects.

According to one of the embodiments, this prior art design involves two rotors, of which the inner one is the rotor with storages and the outer one is capable of turning relative to the inner rotor and provided with flaps adapted to close or open the storages depending upon the angular position of the outer rotor with respect to the inner one.

The storage of said prior art device can be fashioned either as radical sections separated by partitions or as radially positioned containers having a series of shelves located one above the other.

This latter design also suffers from the lack of automatic loading and unloading of the storages and of automatic retrieval of the desired document and, as a result, from a low operation speed of the system.

F.R.G. Pat. No. 1,805,519, class 42 m 6 7-14, of Oct. 16, 1969, discloses an automated information retrieval system involving the use of a plurality of separate reading heads with fiber optical light guides and photocells for the transfer of labeling code to a photoelectric converter.

Said information retrieval system involves the movement of a plurality of reading heads during the time of retrieval along a large array of documents. In addition, the automatic output of single documents likewise involves the movement of a large array of documents.

Said prior art information retrieval system suffers from structural complexity and inadequate operation speed in the course of document retrieval.

F.R.G. Pat. No. 903,285, class 43 a 42-02, of 1953, discloses a distributing device for letters and like flat objects, wherein a certain number of working plates accumulate flat objects and direct them at the same rate to respective storages. Each storage is provided with a conveyer belt ensuring reciprocation for accumulating objects in the storage.

This latter device fails to provide for the automatic retrieval of desired flat objects.

The operation speed of the device is likewise very low.

The Magnacard information retrieval system described by A. I. Mihailov et al. in Osnovy informatiki (Fundamentals of Information Science), Nauka Publishers, Moscow, 1968, p. 577; by R. L. Laurent, Information Storage and Retrieval, Missile Design and Development, No. 10, 1960, pp. 56-58; R. M. Hayes, The Magnacard System, in Information Retrieval and Machine Translation, Part 1, Interscience Publishers, New York 1960, pp. 563-574; Magnacard, Data Processing (Engl.), v.4, No. 1, 1962, pp. 16-25, comprises a sorting unit with four vacuum drums. The system handles magnetic or videomagnetic cards fed into horizontally extending magazines. Each magazine has a capacity of up to 3 thousand cards. The magnetic cards are sorted by means of vacuum drums. The drums are provided with vacuum means for conveying the cards and transferring them from one drum to another, and with means for delaying videomagnetic cards and projecting their images onto a large screen. The horizontal magazines are stored in special automated storages equipped with means for moving the magazines in both horizontal and vertical planes for feeding the magazines to the sorting unit.

A disadvantage of said system consists in that it is necessary to prepare information for storage, i.e., transfer said information onto magnetic or videomagnetic cards.

In addition, it is often necessary that originals of documents be stored and automatically accounted for in envelopes, for which no provision is made in the latter system.

The Walnut information retrieval system also described by A. I. Mihailov et al. in Osnovy informatiki (Fundamentals of Information Science), Nauka Publishers, Moscow, 1968, p. 583; Large-Capacity Document Storage and Retrieval System, Engineer, v. 212, No. 5508, 1961, pp. 291–292; A Walnut for Information Retrieval, Data Processing, v.3, No. 8, 1961, pp. 26–27; N. A. Vogel, Walnut Document Storage and Retrieval System, Proceedings of the 11th Annular Meeting and Concentration of the National Microfilm Association, Annapolis, National Microfilm Association, 1963, pp. 27–39, has been developed in the United States by the International Business Machines Corporation. Information is transferred to microfilm. Microfilm strips are stored in plastic cassettes which, in turn, are stored in radial magazines of a passive storage drum of a storage device.

A document address in the Walnut information retrieval system consists of a number of cassette in the given module, serial number of cassette in this module, serial number of microfilm strip in the cassette, frame number and the number of pages in the document. After the address has been read out from an aperture punched card, the storage drum sets the desired cassette to the output position by rotating it and radially shifting in the direction of shortest movement. Then, special means is used to adjust the cassette position in the output unit while the clamping mechanism of said unit grips the desired microfilm strip and pulls it out of the cassette such that the first frame of the microcopy of the desired document should be in the recopying position.

A disadvantage of said system consists in that information should be transferred to special carriers.

The present inventors have earlier disclosed an apparatus for sorting objects, according to pending applications field in a number of countries, namely, U.S. patent application Ser. No. 858,800, British patent application No. 0983/78, French patent application No. 78.07325, F.R.G. Patent Application No. 28.02.071 and Japanese patent application No. 8772/0978.

Said prior art apparatus for sorting objects, mainly, letters, comprises conveying means and selectors located in guiding channels shifted in a single plane with respect to each other, and serving to communicate storages with letter feeding means. The guiding channels have, before the storages, side branchings with channels and conveying means, located in a plane normal to that in which the guiding channels are located, the selectors being series-mounted in the guiding channels and shifted in the direction of movement of the objects, the selector most remote from the storages being the first in the direction of movement of the objects. However, this prior art device does not provide for inverted sorting of objects, i.e., locating an already sorted object followed with its output from the apparatus.

The present invention have further disclosed a machine for sorting flat objects, for which the following patents were granted:
1. U.S. Pat. No. 4,067,459
2. British Pat. No. 1,503,102
3. French Pat. No. 2,303,610
4. F.R.G. Pat. No. 2,610,034

The machine is designed for automatic sorting of flat objects and the automatic unloading of groups of sorted objects and comprises a cylindrical housing on whose walls storages of objects are arranged in several decks over the periphery thereof. A device for conveying the objects is fashioned as a squirrel-cage return drum and is accommodated inside the housing, said drum carrying on its spokes, with a possibility of moving along the latter, object holders designed to convey the objects to the storages, containers for delivering the objects from the storages and cams for moving storage platforms upon the extraction of objects, said cams cooperating via a selector unit with a respective profile of a stationary master form. A feeder for feeding the objects into the machine is provided with a mechanism for feeding an array of objects, a separator and an inspection unit for identifying the distinguishing feature of each object. The machine is further provided with a conveyor for conveying the objects out of the machine and with a processor for automatic control of the machine.

However, said prior art machine also does not provide for inverted sorting of objects, i.e., location and output of an already sorted object, while the space of flat object storage is limited to a single cylindrical unit.

The foregoing review of prior art designs of information retrieval systems and like devices is indicative of the fact that no fully automatic information retrieval systems exist at present that exhibit a high operation speed of inverted sorting and, which is especially important, are at the same time capable of handling originals of documents.

SUMMARY OF THE INVENTION

It is an object of the present invention to eliminate the afore-mentioned disadvantages of prior art information retrieval systems and the like.

It is another object of this invention to provide for inverted sorting of originals of documents.

It is still another object of the present invention to ensure a high operation speed of sorting and retrieval of flat objects.

It is a further object of the invention to provide for a reliable conveyance of objects.

Other objects of the present invention include the provision of convenience in repair and maintenance of the machine, as well as of its simpler design and operation.

And, finally, it is an object of the present invention to develop a machine for sorting and retrieval of flat objects wherein the number of storages of flat objects could be increased by adding cylindrical housings with storages.

These and other objects of the present invention are attained in a machine for sorting and retrieval of flat objects, comprising a cylindrical housing on whose walls storages of objects are arranged in several decks over the periphery thereof, and means designed for conveying the objects and fashioned as a squirrel-cage return drum is accommodated inside the housing. The drum carrying on its spokes, with a possibility of moving along the latter, object holders designed to convey the objects to the storages, containers for delivering the objects from the storages and cams for moving storage platforms upon the extraction of objects, which cams cooperate by means of selector modules with a respective distributing channel of a stationary vertical master form. The machine further comprising means for feeding the objects into the machine having a mechanism for feeding an array of objects with a mechanism for separating the objects one-by-one from the array and a means for identifying the distinguishing feature of each object, a conveyer for conveying the objects out of the machine and means for the automatic control over the machine. The machine also comprises a means for transferring a group of objects from a preset storage mounted on the cylindrical housing to a means designed for feeding the objects into the machine, said transferring means including a platform which cooperates both with the container adapted to deliver a group of objects from the storage and with a mechanism designed to deliver the objects to a separator of the means designed for feeding the objects into the machine, the stationary cylindrical master form being provided with additional selector modules and profiles closed over the master form circumference in the top and bottom portions thereof.

Such an arrangement helps to expand the technological capabilities of the machine by providing for inverted sorting of flat objects and makes it possible to use the machine of the invention as an information retrieval apparatus for the retrieval of originals of documents and other flat objects such as those used for filling, at a high operation speed.

It is a requisite condition that information retrieval apparatus should produce the requested document.

To this end, the means designed for feeding the objects into the machine is provided with a valve adapted to extract desired objects from the flow and mounted in the direction of the flow of objects after the means for identifying the distinguishing feature of an object.

Thus, the valve ensures the delivery of the desired flat object to the operator's table.

In order to ensure the delivery of objects from the feeding means to the conveying-and-distributing device of the machine, the means designed for feeding the objects into the machine has a box adapted for the reception and working storage of objects and made split to provide for the possibility of passage therethrough of an object holder delivering objects to a storage.

This helps synchronize the operation of the feeding and conveying-and-distributing means and, in particular, synchronizes the operation of the feeding means and object holders.

It is rather important that the reliability of the conveyance of flat objects should be ensured, to which end each object holder is fashioned as a crocodile clip.

Such a design of the object holder ensures a fixed position of a flat object in an object holder, which rules out the possibility of interaction of the flat object with working elements of the machine and, consequently, of damage to the flat object.

In order to provide for the simplicity of repairs, the cylindrical housing of the machine with object storages is made up of several sections movable in a radial direction, while the cylindrical master form is made composite of a series of blocks capable of being swung towards the interior of the machine.

Such an arrangement of the cylindrical housing with storages provides a free access to the object holders and conveying system of the machine while the design of the cylindrical master form composed of a series of blocks capable of being swung towards the interior of the machine makes for a free access to the distributing system of the machine.

In order to facilitate the operation of the machine and simplify the design of the conveyer for conveying flat objects out of the machine, said latter conveyer is mounted in the top portion of the cylindrical housing of the machine and adjoins the top closed distributing channel of the cylindrical master form.

This helps considerably in simplifying the conveyer design and providing an access to the machine units unobstructed by the conveyer.

Still another requisite condition to be met by information retrieval systems is the maximum possible amount of information stored. In the present case, it is the number of flat objects in the storages.

To this end, the number of cylindrical housings of the machine can be increased by adding new housings. In so doing, the cylindrical housing with storages is provided with an additional box designed for the reception and working storage of objects, said additional box cooperating with the object holders of the housings being added, while the conveyer for conveying the objects out of the machine is likewise made to cooperate with the containers of the housings being added, the platform of the means for transferring groups of objects from a storage to the means designed for feeding the objects into the machine being made movable along the cylindrical housing being added.

This provides for a considerable increase in the amount of information stored, in the course of inverted sorting of objects at a high operation speed.

BRIEF DESCRIPTION OF THE DRAWINGS

Other objects and advantages of the present invention will become apparent upon considering the following detailed description of an examplary embodiment thereof, with due reference to the accompanying drawings in which:

FIG. 12 shows a holder of flat objects;

FIG. 13 is a view of the object holder taken in the direction of arrow B in FIG. 12;

FIG. 14 is a view of the object holder taken in the direction of arrow C in FIG. 13;

FIG. 15 is a view of the object holder taken in the direction of arrow D in FIG. 13;

DETAILED DESCRIPTION OF THE INVENTION

Figure 1:
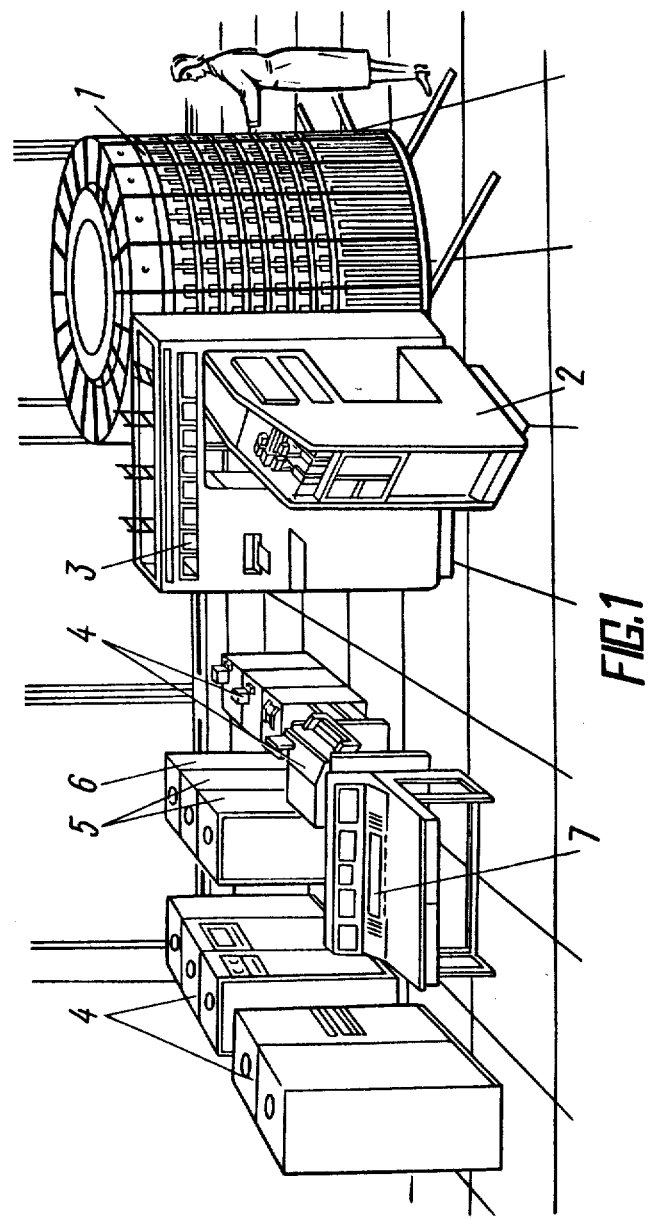
FIG. 1 is a general view of the machine for sorting and retrieval of flat objects, equipped with a control board, electronic instruments and a control computer system.

Referring now to FIG. 1 of the accompanying drawings, the machine for sorting and retrieval of flat objects comprises a mechanical part made in the form of a cylindrical unit 1 with means 2 designed for feeding flat objects into the machine and means 3 designed for delivering groups of flat objects out of the machine, and an electronic part which includes a control computer system 4, a character reader 5, a power supply 6 and a joint control board 7 for controlling both the electronic and mechanical parts of the machine.

Figure 2:
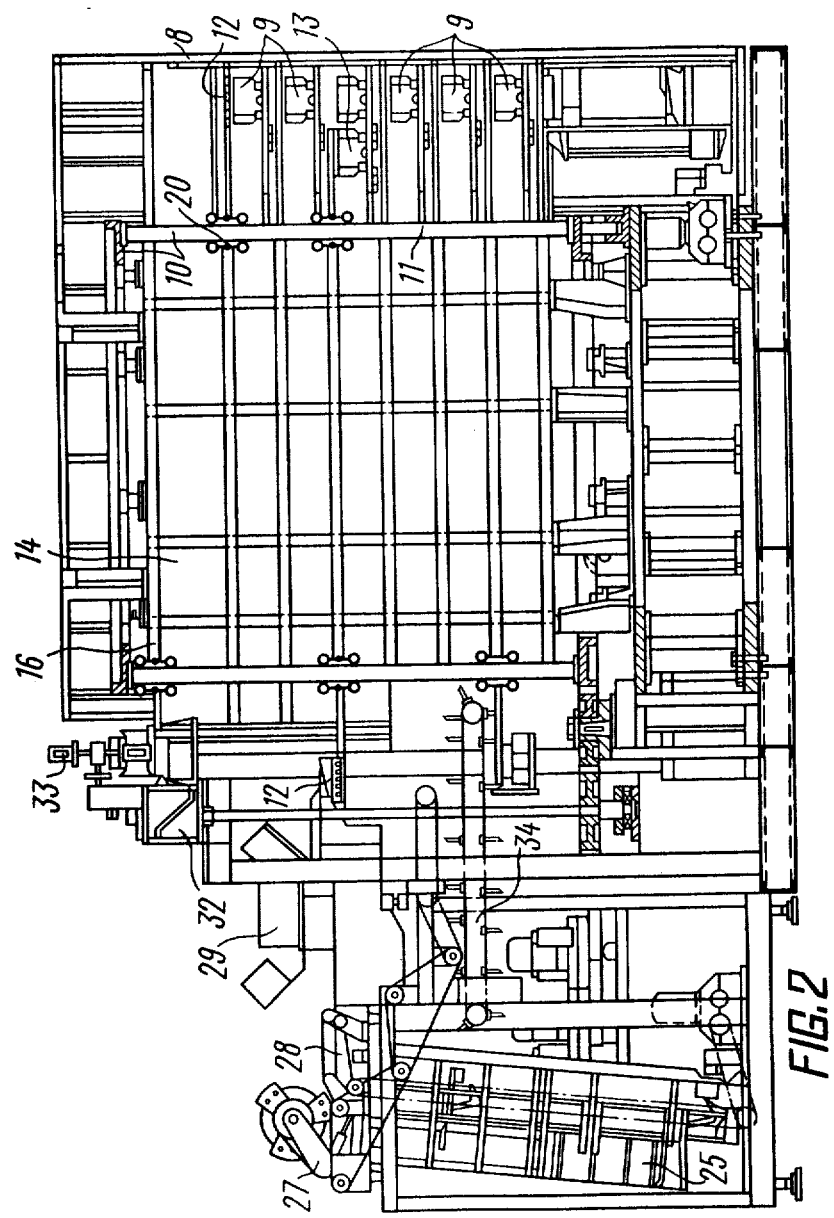
FIG. 2 is a side view of the mechanical part of the machine for sorting and retrieval of flat objects.
Figure 3:
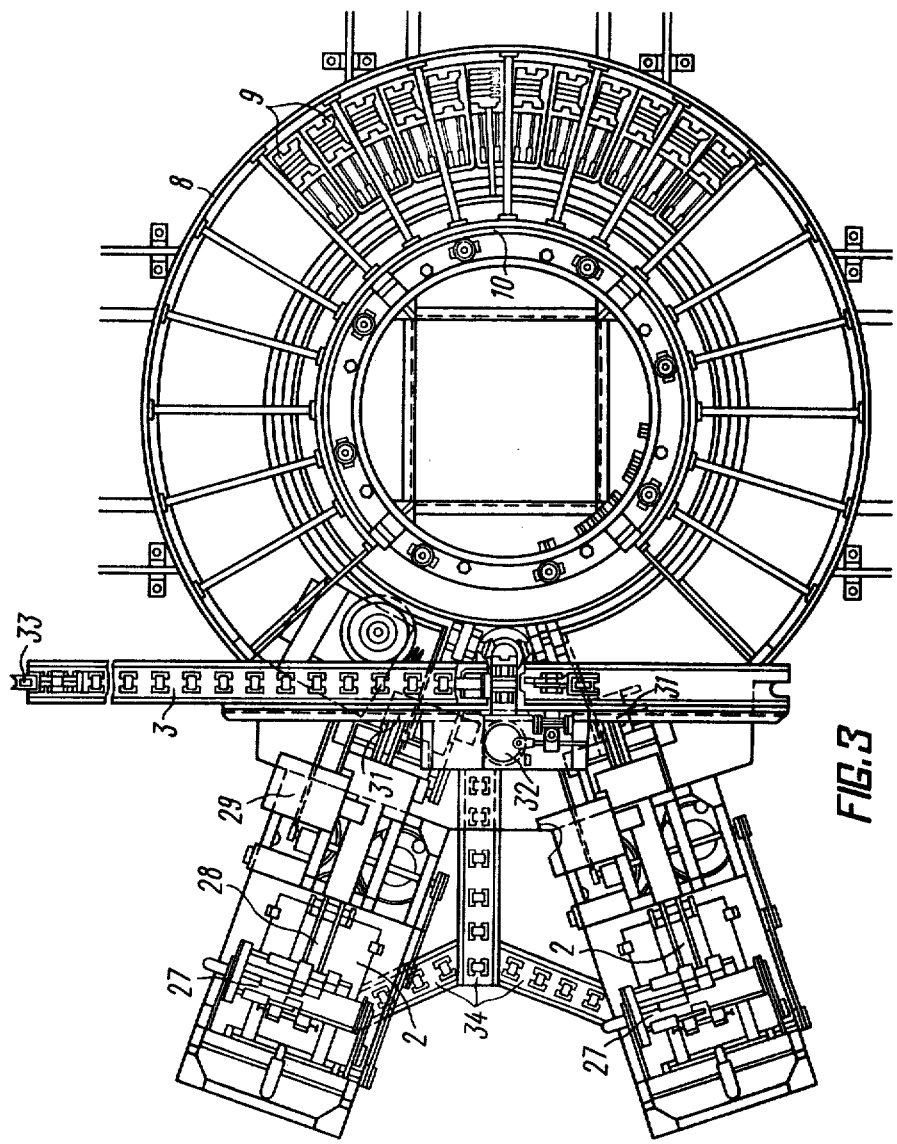
FIG. 3 is a plan view of the machine for sorting and retrieval of flat objects.
Figure 4:
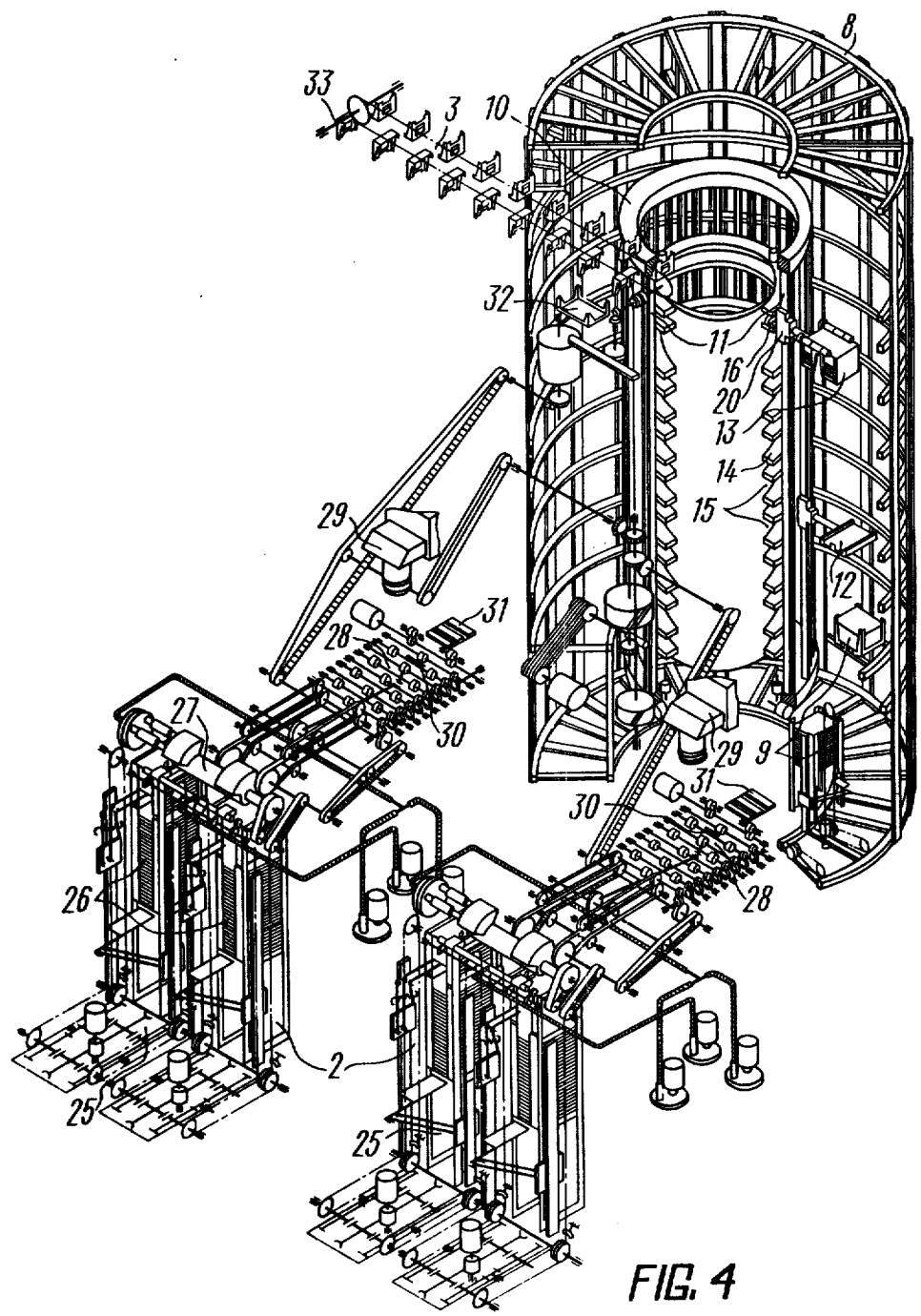
FIG. 4 is a functional diagram of the machine of the invention.

The mechanical part of the machine comprises a cylindrical housing 8 (FIGS. 2, 3 and 4), on the periphery of whose outer surface storages 9 are located in several decks. Coaxially mounted inside of the cylindrical housing 8 is a squirrel-cage drum 10 on whose spokes 11 there are mounted, with a possibility of moving along the axis of said spokes, holders 12 of flat objects and containers 13 designed for unloading groups of flat objects from the storages 9. Coaxially mounted inside the drum 10 is a stationary cylindrical master form 14 with a system of distributing channels 15. Each holder 12 and a container 13 are kinematically coupled with the aid of a roll 16 and respective channel of the master form 14. In places of mating of the channels of the master form 14, switches 17 are provided and shifted by the machine control means 4.

The mechanical part of the machine of the invention may include several cylindrical units 1 similar to that described above, as shown in FIG. 5, in order to increase the number of sorting directions and the amount of flat objects stored.

Figure 6:
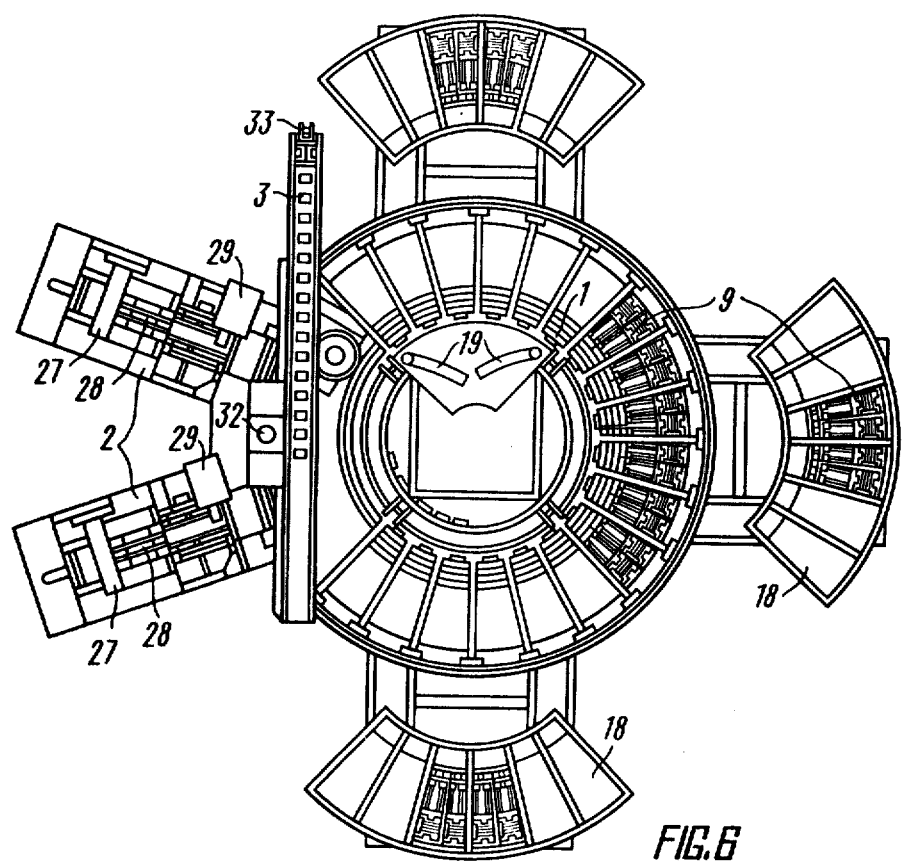
FIG. 6 is a general plan view of the machine of the invention, with drawn out storage sections.

The cylindrical housing 8 with the storages 9 consists of sections 18 (FIG. 6) capable of moving in a radial direction away from the machine axis, while the body of the cylindrical master form 14 is made composite of a series of blocks 19 capable of being swung towards the interior of the machine in order to provide for convenient repairs of the machine and servicing of the conveying units 10, 11, 12, 13 and the distributing system 14, 15 of the machine.

Figure 7:
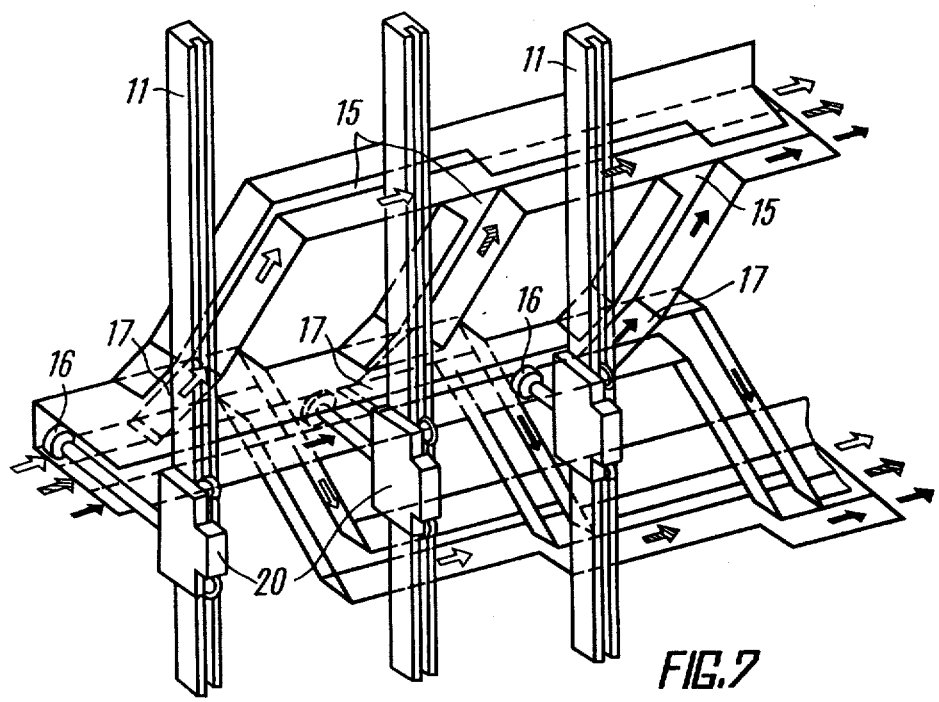
FIG. 7 illustrates schematically a selector module for varying the direction of movement of three flows of flat objects, and is shown with the spokes of the squirrel-cage drum and carriages.

The movable switches 17 of the distributing channels 15 are coupled with the drive and control means and are combined in so-called selector modules, as shown in FIG. 7 also illustrating the spokes 11 of the squirrel-cage drum 10, in which spokes there are mounted carriages 20 movable along the axis of the spokes 11 and rigidly coupled on one side to the rolls 16 cooperating with a respective channel 15 of the master form 14 and the switch 17, while on the other side said carriages are rigidly coupled to the holders 12 of flat objects or to the containers 13 of groups of flat objects.

Figure 8:
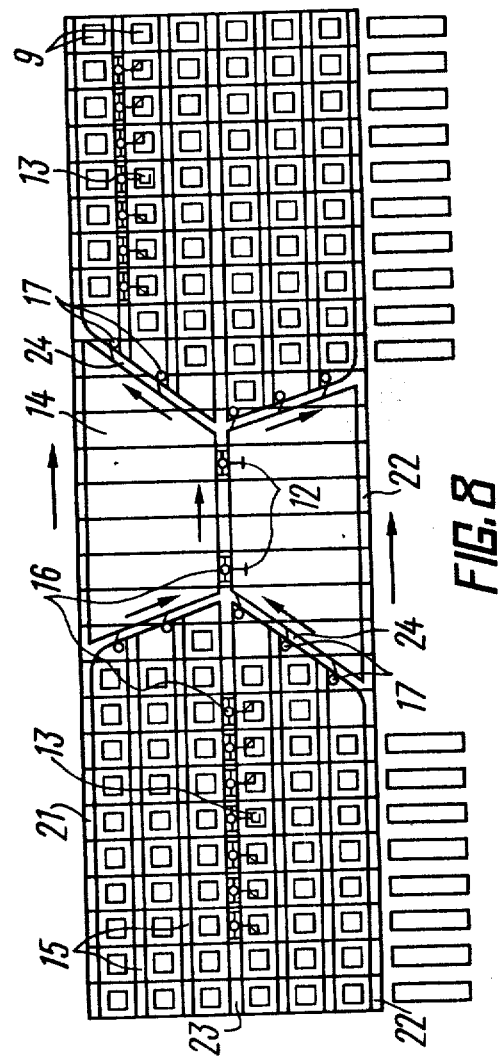
FIG. 8 is a developed view of a stationary cylindrical master form with a system of distributing channels.

A developed view of the cylindrical master form 14 (FIG. 8) comprises a series of parallel-arranged distributing channels 15 of which the upper one 21, lower 22 and central 23 are made closed over the circumference of the master form 14. The other channels 15 communicate with each other and with the three closed channels 21, 22 and 23 by means of channels 24 inclined with respect to the vertical axis of the machine. Also shown in FIG. 8 are the movable switches 17 serving to direct the holders 12 and containers 13 to the decks of the storages 9.

Figure 10:
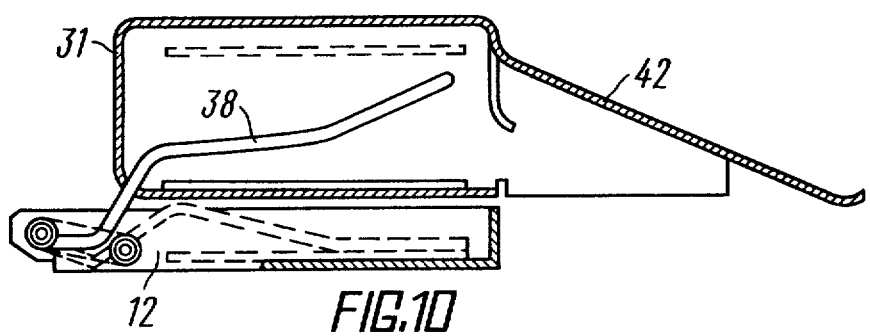
FIG. 10 is a cross-sectional view showing a box for the reception and working storage of flat objects, and also showing a holder of said objects.
Figure 11:
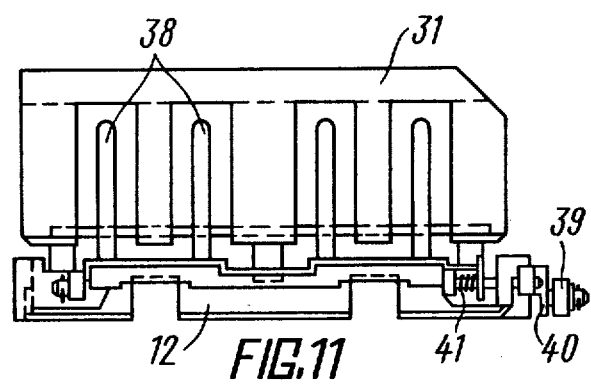
FIG. 11 is a view of the box of FIG. 10 taken in the direction of arrow A in FIG. 10.

The machine of the invention may include several means 2 for feeding the flat objects into the machine, depending on the required capacity of the machine (cf., FIGS. 3 to 6). Each feeding means 2 includes a mechanism 25 for feeding an array 26 of objects to a mechanism 27 designed for separating the objects one-by-one from the array, a mechanism 28 designed for conveying the objects to the station where their distinguishing features are identified, optoelectronic reader means 29, a valve 30 adapted to extract the desired object from the flow of objects onto the operator's table and a box 31 (FIG. 10) designed for the reception and working storage of flat objects.

The box 31 for the reception and working storage of flat objects is made split (cf., FIG. 10) to provide for the possibility of passage therethrough of the object holder 12 (FIGS. 10 to 15) fashioned as a crocodile clip.

Figure 5:
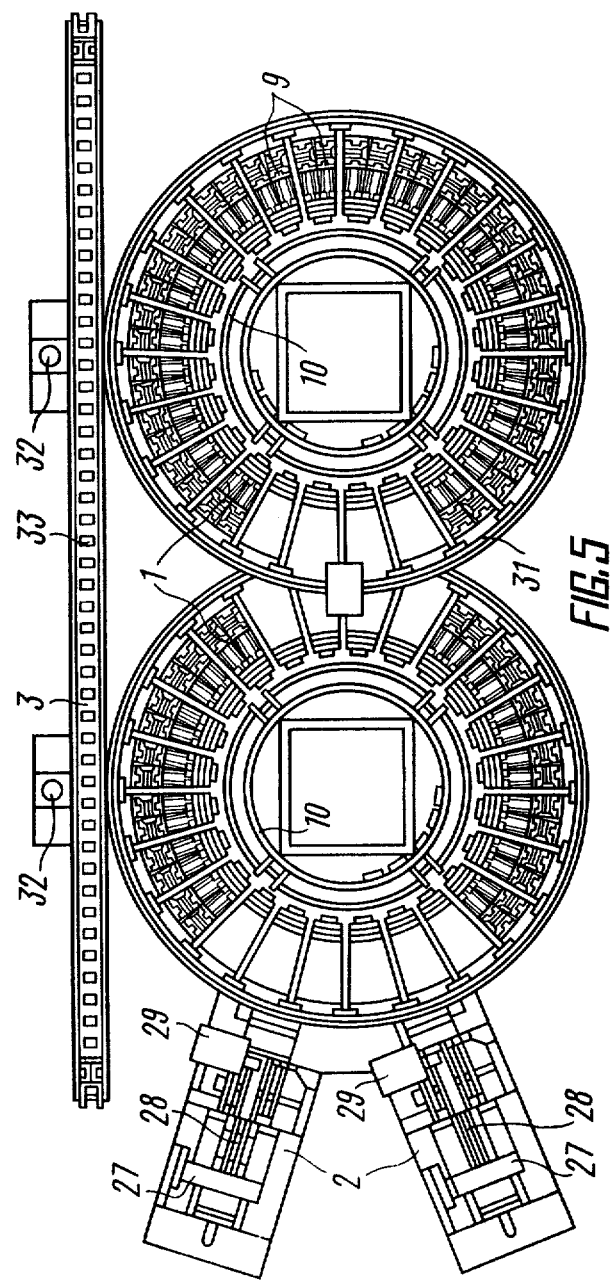
FIG. 5 is a general plan view of a machine of the invention, having two cylindrical housing units for increasing the amount of information stored.

In case the machine of the invention includes several cylindrical units 1, as shown in FIG. 5, each one of the cylindrical units 1 is provided with a box 31 for the reception and working storage of flat objects.

The means 3 (FIG. 1) designed for delivering groups of flat objects out of the machine comprises containers 13 (FIG. 4) for unloading the objects from the storages 9, means 32 (FIGS. 2 to 6) designed for transferring groups of objects from the containers 13 to a conveyer 33 designed for conveying groups of objects out of the machine and means 34 (FIGS. 2 and 3) for delivering groups of objects into the feeding means 2 of the machine.

The conveyer 33 for conveying the objects out of the machine is mounted in the top portion of the machine (FIGS. 1, 2 and 4) and adjoins the top closed distributing channel 21 of the cylindrical master form 14.

Figure 16:
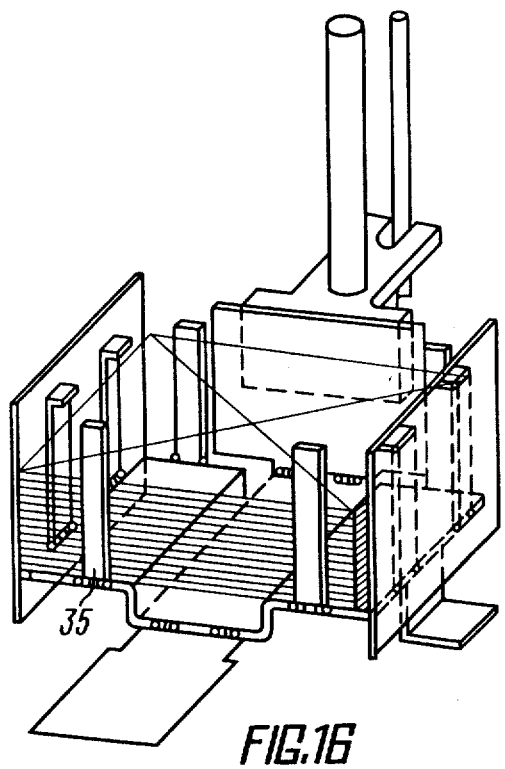
FIG. 16 shows a movable platform for the transfer of groups of flat objects to the feeding means.
Figure 17:
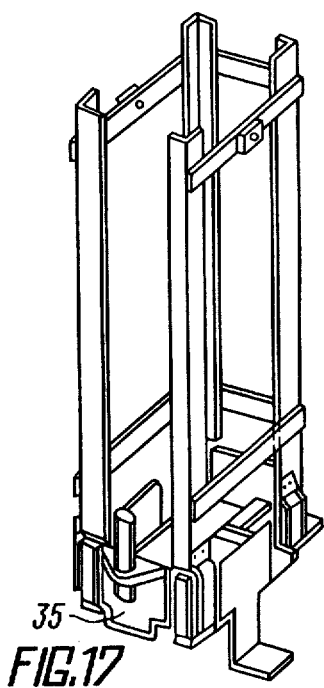
FIG. 17 shows a bin designed for temporary working storage of an array of flat objects and for their delivery to a separator.

The mechanism 34 for delivering groups of objects into the feeding means 2 of the machine includes a movable platform 35 (FIGS. 16, 17) which cooperates both with the transferring means 32 (FIG. 16) and with the mechanism 25 for delivering an array 26 of flat objects into the feeding means 2 (FIG. 17).

The movable platform 35 adjoins the bottom closed distributing channel 22 (FIG. 8).

In the case of several cylindrical units 1, as shown in FIG. 5, each one of the cylindrical units 1 is provided with a platform 35 movable along the cylindrical units 1 being added.

The design of the herein disclosed machine provides both for sorting of flat objects and for the reverse process when it is necessary to separate from a sorted group of objects the desired object on the basis of certain distinguishing features of the latter. Such operations can be best described as "inverted sorting" illustrated diagrammatically in FIG. 18.

The herein disclosed machine for sorting and retrieval of flat objects operates in the following manner.

All of the operations of sorting and retrieval of documents are effected upon continuous rotation of the drive drum 10.

Figure 9:
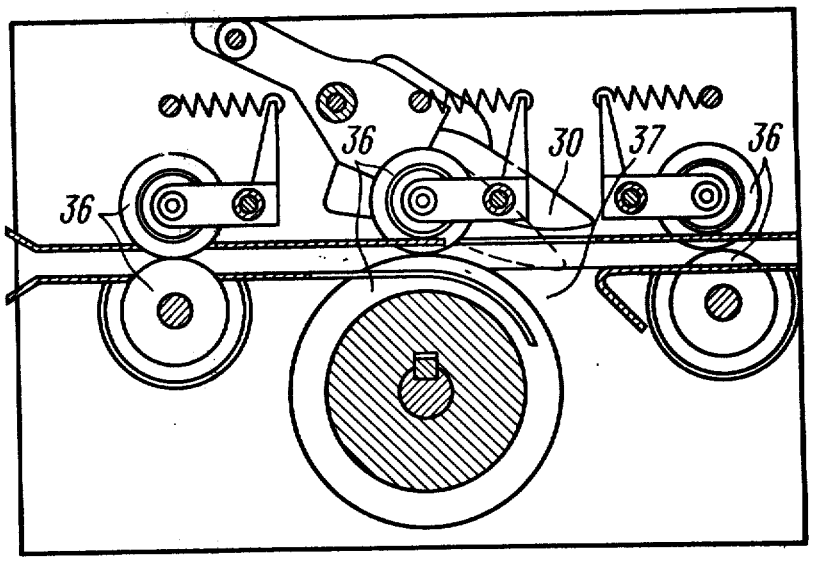
FIG. 9 shows a valve for deflecting flat objects towards the operator's table.

An oriented array (FIGS. 2 and 4) of objects to be sorted is loaded into the feeding means 2 and delivered by means of the mechanism 25 to the separator 27 for the separation of objects from the array one-by-one. The mechanism 28 conveys the objects in front of the optoelectronic reader means 29 of the character reader 5 wherein the distinguishing features of each object are analyzed, say, numerical notation, after which the flat object is directed towards the valve 30 (FIG. 9) where the desired object is extracted from the machine. One of the two states is possible upon the supply of object to the valve 30. If the object is to be sent to some or other storage 9, i.e., under conditions of sorting, the valve 30 is open, as shown in FIG. 9, and the flat object is conveyed by means of roller pairs 36 to the box 31 for working storage. Should the character reader 5 recognize the desired distinguishing feature of an object, the valve 30 will extract the object via channel 37 from the flow of objects and direct it towards the operator's table. Thereupon, the valve 30 re-opens and a group of flat objects is directed towards appropriate storages. The moment a flat object is delivered to the box 31, one of the two states is possible as well.

Inasmuch as the machine is provided with several (in the present case, two) feeding means, there is possible a state in which the box 31 already containing a flat object is approached by the object holder 12 carrying an object from the preceding feeding means. In this case, an arm 38 of the holder clamp will be closed, as shown by the broken line in FIG. 10 and by the solid line in FIG. 11. The opening and closing of the arm 38 is effected by cooperation of the rollers 39 of arms 40 locked in one of the positions by a spring 41. The object holder will pass by the box 31 (in the present case, below the box).

In case a flat object in the box 31 is to be gripped by the holder 12, its arm 38 is open and passes in the slots of the box 31 to grip the object with the aid of a baffle 42 and convey said object so that the box 31 should be ready to receive the next object.

The character reader 5 issues an instruction to the control computer system 4 which makes use of the switches 17 to direct the holder 12 with the object into some or other distributing channel 15 towards the desired storage 9.

On approaching the desired storage 9, the holder 12 will leave the object in the latter and move on together with the squirrel-cage drive drum 10 to fetch the next object.

The movable controlled switches 17 of the distributing channels 15 can operate at a rate several times higher than that of the distribution (sorting) of objects; for example, in the case of a three-flow sorting system shown in FIG. 7, the rate of operation of the switches 17 will be three times higher than the time of the working cycle of sorting.

The movement of the holder 12 over the distributing channels 15 is shown schematically in FIG. 8.

For the retrieval of a flat object contained in a storage 9, it is sufficient to select on the control board 7 its distinguishing feature, say, figure notation. The control computer system 4 will identify the group of flat objects or storage containing the desired object and issure an instruction to the container 13 and movable switches 17, according to which the container 13 will come to the desired storage 9 via the system of distributing channels 15 (FIG. 8) and unload from said storage a group of flat objects including the desired one. Then, the container 13 will continue its circular motion and, together with the group of flat objects will pass through the system of distributing channels 15 with the aid of the controlled switches 17 to the top closed channel 21 or to the bottom closed channel 22 (FIG. 8).

When the container 13 gets to the top closed channel 22, it encounters the transferring means 32 (FIGS. 2-6) which transfers the group of flat objects from the container 13 onto the conveyer 33. The conveyer 33 will either convey the entire group of flat objects from the machine (FIG. 3) and bring, for example, the entire group including the desired object to the operator's table, or it will deliver the group of objects of the feeding means 2 (FIG. 1) for extracting the desired object from said group in the afore-described manner.

If the container 13 gets to the bottom closed channel 22, it encounters the platform 35 movable in a radial direction (cf., FIGS. 2, 3, 16, 17). In so doing, the group of flat objects will be delivered by the conveying means 34 directly into the feeding means 2 for extracting the desired object from said group in the afore-described manner.

Figure 18:
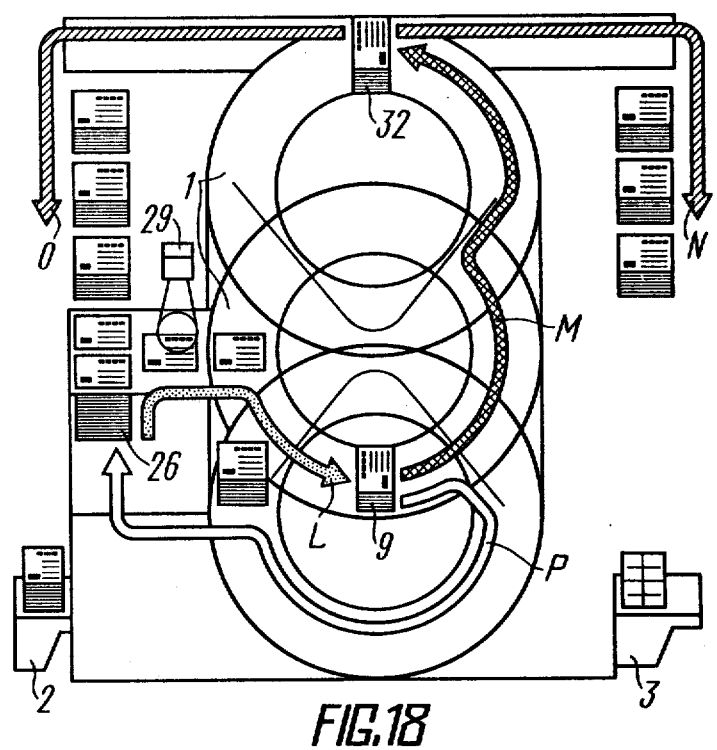
FIG. 18 illustrates diagrammatically the inverted sorting of flat objects, according to the invention.

The process of sorting the objects and the reverse process of retrieving the desired flat object on the basis of its distinguishing features from a sorted group of objects, i.e., inverted sorting, are illustrated schematically in FIG. 18.

The main sorting flow of flat objects from the feeding means into the storages 9 is shown with arrow L. The unloading of the storages 9 into the conveyer 33 for conveying the objects out of the machine is shown with arrow M. Arrow N shows the removal of a group of flat objects from the machine, while arrow O shows the feeding of said group into the feeding means. A direct delivery of a group of objects into the feeding means (retrieval of the desired object) is shown with arrow P.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. In a machine for sorting and retrieval of flat objects, comprising a cylindrical housing on whose walls storages of objects are arranged in several decks over the periphery thereof, and means designed for conveying the objects and fashioned as a squirrel-cage return drum accommodated inside the housing, said drum carrying on its spokes, for movement along the latter, object holders designed to convey the objects to the storages, containers for delivering the objects from the storages and cams for moving storage platforms upon the extraction of objects, which cams cooperate by means of selector modules with a respective distributing channel of a stationary vertical cylindrical master form, said machine further comprising means for feeding the objects into the machine having a mechanism for feeding an array of objects with a mechanism for separating the objects one-by-one from the array and means for identifying a distinguishing feature of each object, a conveyer for conveying the objects out of the machine and means for automatic control of the machine, an improvement consisting in that the machine further comprises a means for transferring a group of objects from a preset storage mounted on the cylindrical housing to the means designed for feeding the objects into the machine and including a platform which cooperates with a container adapted to deliver a group of objects from the storage and with a mechanism for delivering the objects to a separator of the means for feeding the objects into the machine, the stationary cylindrical master form being provided with additional selector modules and distributing channels closed over the circumference of the master form in the top and bottom portions of the latter.

2. A machine as set forth in claim 1, wherein the cylindrical housing with object storages is made up of several sections movable in a radial direction while the cylindrical master form is made composite of a series of blocks capable of being swung towards the interior of the machine.

3. A machine as set forth in claim 1, wherein the conveyer for conveying the objects out of the machine adjoins the top closed distributing channel of the cylindrical master form and is mounted in the top portion of the cylindrical housing of the machine.

4. A machine as set forth in claim 1, wherein the cylindrical housing of the machine with storages has an additional box for the reception and working storage of objects, said box being kinematically coupled with the object holders of storage housing being added to the machine, while the conveyer for conveying the objects out of the machine is constructed to cooperate with the containers of housings being added, the platform of the means for transferring groups of objects from a storage to the means for feeding the objects into the machine being movable along the cylindrical housings being added.

5. A machine as set forth in claim 1, wherein the means for feeding the objects into the machine is provided with a valve adapted to extract desired objects from the flow and mounted in the direction of the flow of objects downstream of the means for identifying the distinguishing feature of an object.

6. A machine as set forth in claim 5, wherein the means for feeding the objects into the machine has a box adapted for the reception and working storage of objects and designed to provide for the possibility of passage therethrough of an object holder delivering objects to a storage.

7. A machine as set forth in claim 6, wherein each one of the object holders is fashioned as a crocodile clip.

* * * * *